United States Patent [19]

Hanning

[11] 4,187,151
[45] Feb. 5, 1980

[54] APPARATUS FOR PRODUCING SWEET WATER

[76] Inventor: Bernard W. Hanning, 50 Firs Dr., Cranford, Middlesex, England

[21] Appl. No.: 771,664

[22] Filed: Feb. 24, 1977

[30] Foreign Application Priority Data

Feb. 24, 1976 [GB] United Kingdom ................ 7238/76

[51] Int. Cl.² .............................................. B01N 3/06
[52] U.S. Cl. ................ 202/185 R; 202/234; 159/1 SF
[58] Field of Search ............ 157/1 SF; 203/DIG. 1, 203/10; 202/234, 185 R, 188

[56] References Cited

U.S. PATENT DOCUMENTS

| 2,424,142 | 7/1947 | Bimpson et al. | 159/1 SF |
| 3,127,330 | 3/1964 | Katz | 202/234 |
| 3,986,936 | 10/1976 | Rush | 203/DIG. 1 |

FOREIGN PATENT DOCUMENTS

| 1953562 | 4/1971 | Fed. Rep. of Germany . |
| 820705 | 11/1937 | France . |
| 1200221 | 7/1970 | United Kingdom . |

Primary Examiner—Hiram H. Bernstein
Attorney, Agent, or Firm—Leydig, Voit, Osann, Mayer & Holt, Ltd.

[57] ABSTRACT

A simple desalination device as described. A base with a preferably transparent or translucent chamber floats on the surface of a body of salt water. Waves cause the chamber to expand and contract, and valves cause air to be pumped through the chamber. The moisture-laden air leaving the chamber is led to a condensation and collection tank below waterlevel.

11 Claims, 5 Drawing Figures

APPARATUS FOR PRODUCING SWEET WATER

This invention relates to apparatus for producing sweet water.

In many countries of the world, salt water is plentiful but sweet water is very scarce. Many proposals have been made for plant and equipment for treating salt water to produce sweet water. Previously proposed desalination equipment has generally been bulky, required high capital investment and in many cases has required substantial energy input in order to produce sweet water. The necessity of high capital investment and in some cases for high energy inputs has severely hampered the introduction of desalination equipment into many countries where it is most wanted since it is precisely those countries where energy supplies are not copious and where capital is not easily to hand.

According to the present invention there is provided desalination apparatus adapted to float on the surface of a body of salt water and comprising a base, a variable volume chamber on the base, air inlet and outlet valves arranged to feed air through the chamber and a water collection and condensation tank below the base, positioned to lie below the surface of the body of salt water and connected to the outlet valve of the chamber. The chamber may be constructed as a variable volume chamber e.g. by providing it with flexible walls and arranging the base of the chamber as two hinged sections. As these sections hinge under the action of waves on the surface of the body of salt water, the chamber alternately expands and contracts in size and the inlet and outlet valves ensure that air is then pumped through the chamber and into the tank. Air may be exhausted from the tank via a suitable pipe, e.g. one terminating above the wave level and attached to the base.

The chamber preferably has a transparent or translucent upper surface and walls in order to promote evaporation of water from the surface of the water at the floor of the chamber, though so long as a temperature differential exists between the water surface and the condensation tank, water vapour will condense and collect in the tank. Alternatively, the chamber may pump air to the tank via a translucent or transparent walled further chamber floating on the surface of the water with the water surface forming the base of the further chamber.

The inlet and outlet valves for the chamber may be arranged in any convenient fashion. Preferably, the inlet valve is arranged in one wall of the chamber. The outlet valve may be arranged in an opposite wall or on e.g. a base floating on the water surface.

The mode of action of the apparatus according to the present invention is simple and straightforward. Because of the "greenhouse effect", water at the base of the chamber or further chamber just noted, i.e. the surface water of a body of salt water on which the apparatus is floated, is heated up and evaporates to water vapour in the chamber. The air passing through the chamber or further chamber becomes charged with this water vapour and entrains it and when that air is pumped into the tank, the water vapour condenses and collects as water in the bottom of the tank.

It is desirable to promote a high rate of water evaporation from the surface and for this purpose the base may be provided with a suitable colour and/or texture or even provided with an appropriate infrared absorptive material. Black cloth is a good absorber and the base of the apparatus may thus consist of a hinged frame with black cloth stretched across it.

In the course of operation of such apparatus according to the invention there may be a build-up of salt residues on the floor of the chamber which would be undesirable as cutting down the absorptiveness to sunlight and decreasing the evaporation rate. In order to avoid this it may be desirable to provide the base with means for automatically renewing the floor of the chamber. For example a continuous web of cloth may be caused to move across the base e.g. by means of a ratchet mecahnism and suitable gearing, the ratchet being operated by the undulations of a hinged base caused by the waves on the water.

The shape of the base may be generally square or elongate with a length to breadth ratio of $1\frac{1}{2}$-3:1 and if elongate such a device should preferably be oriented with its long axis substantially in the direction of travel of the waves i.e. transverse to the wave crests. The size of the apparatus may be chosen having regard to the wave lengths encountered on the water on which it rests in order to couple most efficiently with the wave oscillations to secure satisfactory pumping and, if a cloth transport mechanism of the type just noted is used, to move the cloth round. In order to secure appropriate orientation, the device may be anchored either by a bottom anchor or a sea anchor or by a combination of the two.

Care should be taken to ensure that the air-pumping action of the device is not rendered ineffective by leakage from the chamber as the chamber moves. It is accordingly preferred to provide, about the base of the chamber, a depending skirt extending below the water surface level sufficiently to avoid the risk of leakage from the chamber as the apparatus rocks under the effect of wave action.

The materials of construction of the device should naturally be chosen to resist the influences of salt water and the local weather but techniques of construction of this nature are standard and form no part of the present invention. Transparent or translucent chambers are preferably formed by a cover made of any one of a wide variety of synthetic plastics sheet materials, for example sheet polyvinyl chloride or sheet polyethylene, on a suitable base or frame.

The condensation of water vapour into the below water-line tank may take place simply in the pipe from the chamber to the tank or more sophisticated condensing means, e.g. a condensation coil, may be interposed. Once the water has been collected from the tank it may be extracted therefrom, e.g. using a suitable pumping arrangement, which may be independent of the pumping action of the chamber or may be operated therewith. The tank may be attached to the base, but it is preferred to have the tank static, e.g. on the sea bed, and connected via a flexible pipe to the chamber. The latter arrangement is preferred for large installations, and a plurality of surface floating units may feed a common seabed tank.

In an alternative construction, the present invention provides desalination apparatus comprising a base fixed relative to the sea bed and defining a chamber closed above the lowest water level, a floating outlet valve for air located inside the chamber, a water collection and condensation tank below the surface of the sea, preferably on the sea bed, and connected to the air outlet valve in the chamber, and an air inlet valve on the chamber above the highest water level.

In such a system, water regularly rises and falls in the chamber. As it rises, air is thus pumped out and down to the tank, e.g. on the sea bed. As it falls, fresh air is sucked in from outside. The outlet valve may be mounted on a flotation ring which may have e.g. a skirt of black cloth to enhance heat absorption and water evaporation into the chamber.

The invention is illustrated by way of example with reference to the accompanying drawings in which.

Figure 1:
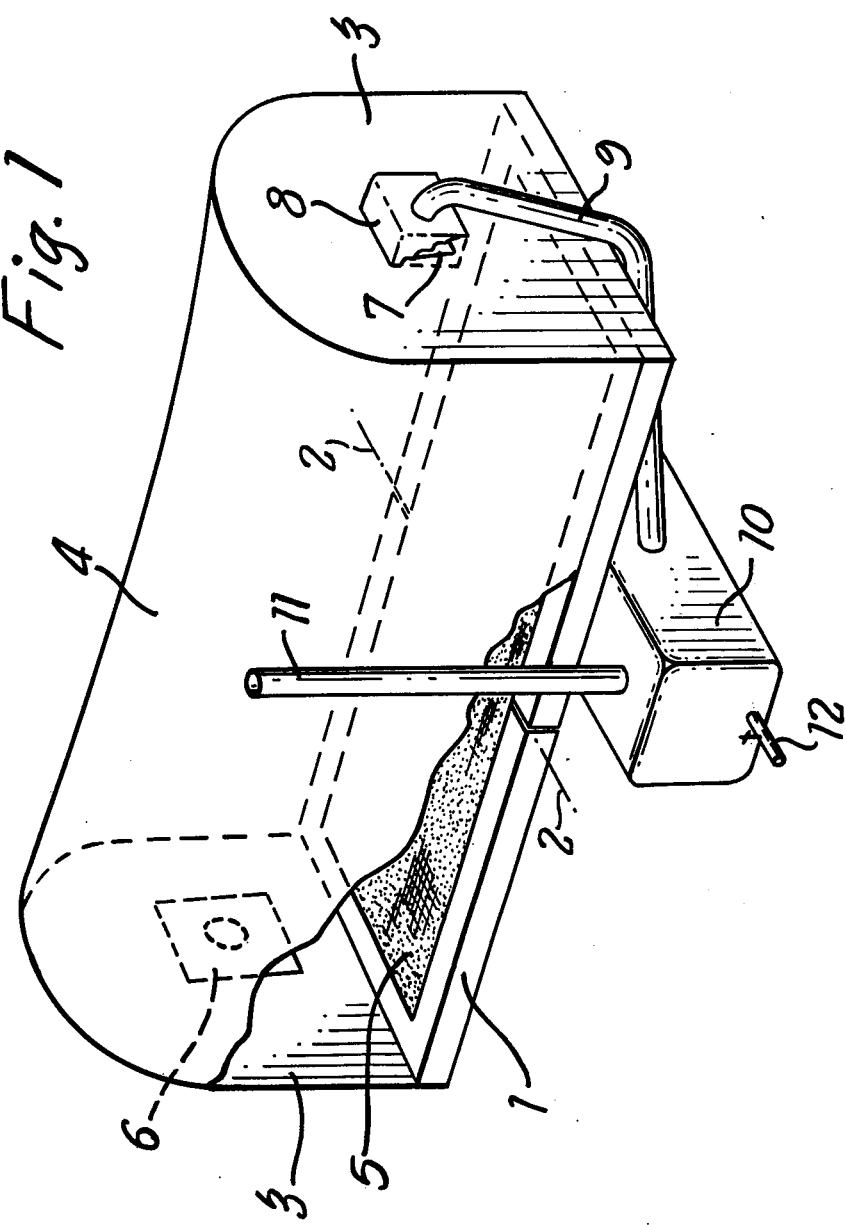
FIG. 1 shows schematically in perspective part cut-away view a simple apparatus according to the invention.

Referring to FIG. 1 the device consists of a rectangular frame 1 which is hinged along a hinge line 2 and is covered at its base with black cotton cloth 5. At each end of the frame are support members 3 and a chamber is formed by a polyvinyl chloride cover 4 extending from one side of the frame 1 to the other and over the support frames 3. On one frame 3 there is a flap valve 6 and on the other end a simple flap valve 7 so that as the volume of the chamber formed between the polyvinylchloride cover 4 and the frame 1 regularly expands and contracts, as the apparatus floats on water and is rocked by waves, the air is induced through valve 6 and expelled through valve 7. Valve 7 is surrounded by a housing 8 connected by a pipe 9 to a below water level tank 10 having a vertical exhaust pipe 11 which rises to lie above the water level again. Tank 10 also has a drain pipe 12 from which water which collects in tank 10 may be withdrawn.

Figure 2:
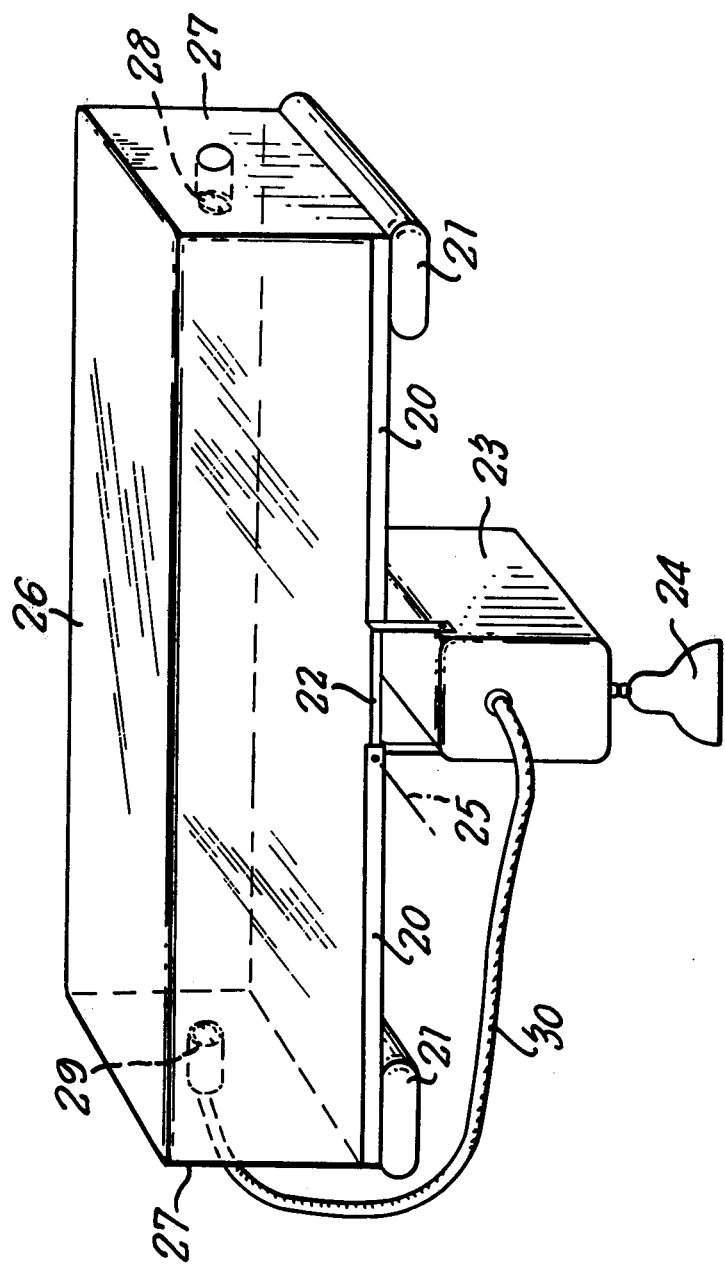
FIG. 2 shows an alternative version.

FIG. 2 shows an alternative embodiment wherein the base is formed from two aluminium channel frames 20 each of which has a float 21. Frames 20 are connected via a central framework 22 to each other and to a tank 23 to which a weight 24 may be attached to give the whole device stability, especially when tank 23 is empty. One frame 20 is hinged along a hinge line 25 to enable a chamber formed by a polyethylene sheet 26 and end plates 27 to vary in volume. One end plate 27 includes an inlet valve 28 and the other an outlet valve 29 which is connected via flexible hose 30 to tank 23. Tank 23 may be provided with quick release fastenings to enable it to be removed when full of sweet water and replaced with an empty tank.

Figure 3:
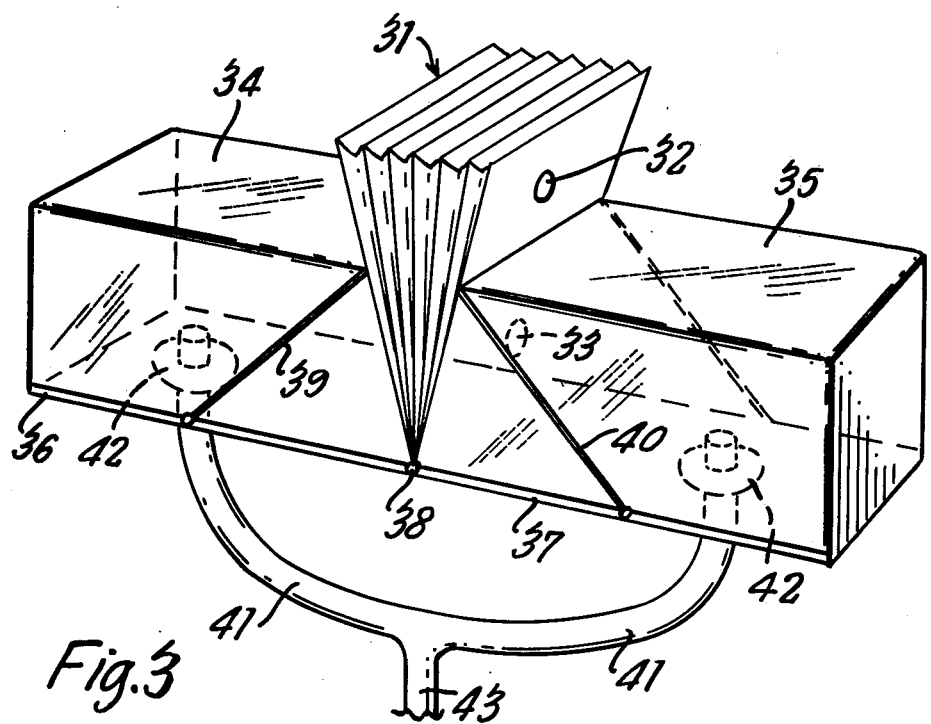
FIG. 3 shows a further alternative.

FIG. 3 shows an alternative version where the two ends of the chamber are simply chambers through which air is pumped by means of a bellows device indicated generally at 31. The bellows has an inlet valve 32 and outlet valves on each side at 33, only one of which is visible, which arrangement pumps air through two chambers 34, 35. Each of chambers 34 and 35 has a transparent or translucent cover e.g. supported on a suitable frame, with a base 36, 37 respectively. The two bases are hinged together at 38 and support the ends of bellows 31 by stays 39, 40. Each of base 36, 37 is at or slightly below water level and is constituted by a frame covered with black cloth to promote evaporation within chambers 34 and 35. Outlet pipes 41 are supported on flotation collars 42 in each of chambers 34, 35 and these merge to a common outlet 43 which passes to a subsurface tank as in the embodiments described above.

Figure 4:
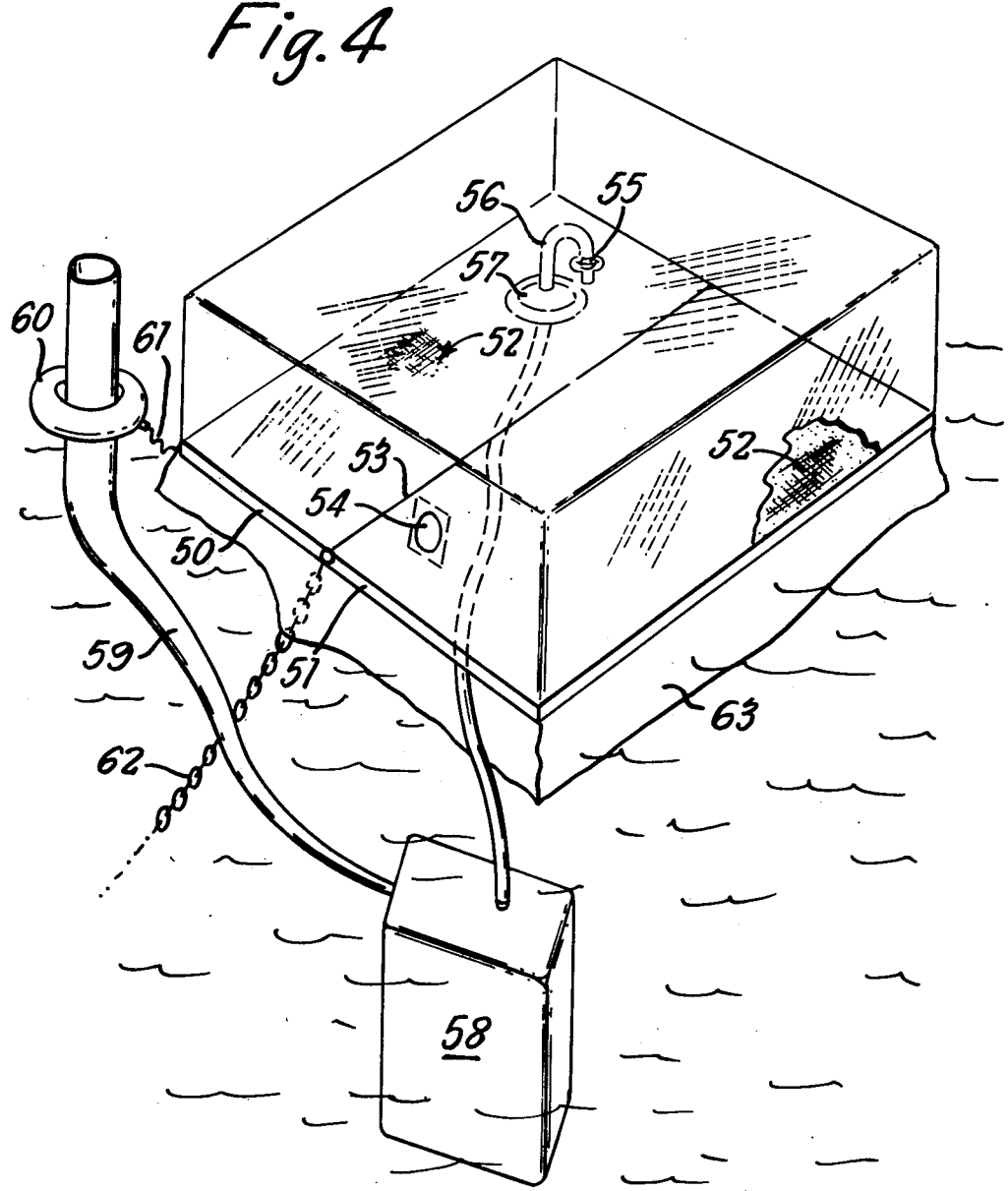
FIG. 4 shows yet another alternative version.

FIG. 4 shows an alternative construction of generally overall sqare shape. The base is formed by two frames 50, 51 hinged together along a hinge line 53 and covered with black cloth 52. A chamber formed of transparent plastics film on a suitable frame (not shown) covers the whole of frames 50 and 51 and is arranged as a variable volume pumping chamber. An inlet valve 54 is mounted on one wall of the chamber and an outlet valve 55 is supported on an outlet pipe 56 in turn supported on a flotation ring 57 which floats in a suitable aperture in cloth 52. Pipe 56 leads to a subsurface tank 58 which has an exhaust pipe 59 the upper end of which is supported above the water level by means of a flotation collar 60 tethered to the frame 50 by a flexible tie 61.

In order to hold the entire floating parts of the apparatus in relatively fixed position, two anchor chains 62 are attached one to each end of the hinge line 53, which are anchored to the seabed in known fashion. In order to prevent leakage as the waves rock frames 50 and 51 up and down from the chamber, there is a weighted depending skirt 63 around the outer periphery of the two frames. The mode of action of the apparatus shown in FIG. 4 is similar to that described in connection with FIG. 1.

Figure 5:
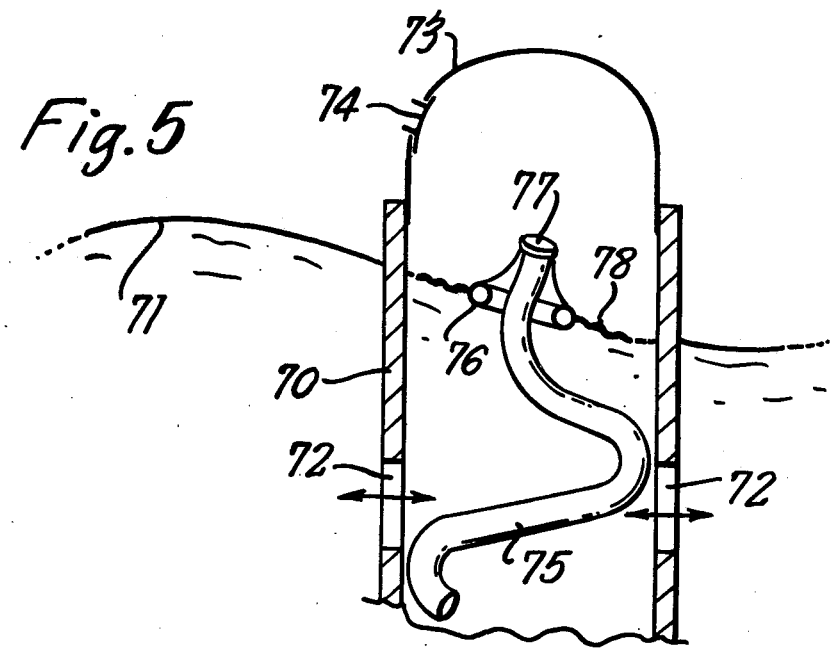
FIG. 5 shows a version with a fixed variable volume chamber.

An alternative construction shown in FIG. 5 which shows a fixed column 70 having below the water level indicated at 71 a number of ports 72 through which water can flow. On top of column 70 is a transparent or translucent dome 73 bearing in its surface above the highest water level 71 an inlet valve 74. Within the column is a generally helical outlet pipe 75 the upper end of which is supported in a flotation collar 76 and which bears an outlet valve 77. As the waves pass the column 70, the space inside the chamber between dome 73 and the water surface regularly expands and contracts. As it expands air is sucked in through valve 74 and as it contracts air laden with water vapour is expelled through valve 77. Flotation collar 76 may have a black cloth skirt 78 to promote evaporation of water within the chamber. Pipe 75 goes to a subsurface tank as in previously described embodiments.

I claim:

1. Desalination apparatus comprising, in combination,
   (a) a variable volume chamber adapted to float on the surface of a body of water and enclose air above the water surface, said chamber having
      walls that move in response to wave action to alternately expand and contract the chamber and thereby effect a corresponding alternate decrease and increase in the pressure of the enclosed air,
      an air inlet valve connecting the atmosphere with said enclosed air so that atmospheric pressure forces air to enter said chamber when wave action causes a decrease in pressure of the enclosed air,
      an air outlet valve through which enclosed air is forced to leave said chamber when wave action causes an increase in pressure of the enclosed air; and
   (b) a water collection and condensation tank having an air inlet connected to the air outlet of said chamber so that air forced to leave said chamber is forced into said tank, and
      an air outlet communicating the air in said tank to the atmosphere so that the air forced into said tank passes through and out of the tank, said tank being postionable beneath the water surface so that air forced from said chamber is cooled as it passes into and through said tank, whereby water vapor in the air condenses and collects in the tank as the air passes through said tank.

2. Desalination apparatus in accordance with claim 1 wherein a portion of the chamber walls is light transmitting.

3. Desalination apparatus in accordance with claim 2 wherein the chamber contains means to absorb infrared radiation passing through said light transmitting portion of the chamber walls.

4. Desalination apparatus in accordance with claim 3 wherein said infrared absorption means comprises black cloth.

5. Desalination apparatus in accordance with claim 3 including means to remove salt residues from said infrared absorption means.

6. Desalination apparatus in accordance with claim 1 wherein said chamber opens downwardly and is adapted to float in a disposition such that the water surface closes said downward opening, the water surface providing a source of moisture for air within said chamber.

7. Desalination apparatus in accordance with claim 1 wherein said chamber is supported on an elongate frame formed from two base segments that are hinged together on a transverse axis of the frame so that said segments can move relative to each other in response to wave action to move the walls of the chamber.

8. Desalination apparatus in accordance with claim 1 including a second chamber that opens downwardly and is floatable so that the water surface closes the downward opening, the water surface providing a source of moisture for air within said second chamber, said second chamber having an air inlet and air outlet, said first chamber's air outlet being connected to said second chamber's air inlet and said second chamber's air outlet being connected to said tank, so that air is pumped from said first chamber to said tank through said second chamber in response to wave action.

9. Desalination apparatus in accordance with claim 1 wherein a plurality of said chambers are connected to said tank.

10. Desalination apparatus comprising
(a) a base and chamber assembly including a downward opening chamber attached to a base that can be fixed to a sea bed to dispose said chamber at least partially above the water surface in a fixed position relative to the sea bed such that, at the lowest water level, a volume of air is enclosed within said chamber above the water surface, said assembly including
an air inlet valve to communicate the atmosphere with the enclosed air so that when the water surface level falls due to wave action, atmosphereic pressure forces air into said chamber to fill the additional volume therein available for air, and
an air outlet valve through which enclosed air is forced out of said chamber when the water surface level rises due to wave action and thereby decreases the volume available for air within said chamber; and
(b) a water collection and condensation tank having an air inlet that is connected to said chamber's air outlet valve so that air forced out of said chamber is forced into said tank,
an air exhaust that communicates with the atmosphere so that air forced into said tank passes through said tank to the atmosphere, said tank being positionable beneath the water surface so that air forced from said chamber is cooled as it passes to and through said tank, whereby moisture in the air condenses and collects in said tank.

11. Desalination apparatus in accordance with claim 10 wherein a plurality of said base and chamber assemblies are connected to said tank.

* * * * *